United States Patent
Lo et al.

(10) Patent No.: US 11,091,217 B2
(45) Date of Patent: Aug. 17, 2021

(54) JOINT STRUCTURE OF A COMPOSITE BICYCLE FRAME AND MANUFACTURING METHOD THEREOF

(71) Applicant: GIANT MANUFACTURING CO., LTD., Taichung (TW)

(72) Inventors: Chi-Wei Lo, Taichung (TW); Chih-Kai Chang, Taichung (TW); Hsu-Pin Hsin, Changhua County (TW); Hung-Chikh Lai, Miaoli County (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 178 days.

(21) Appl. No.: 15/874,855

(22) Filed: Jan. 18, 2018

(65) Prior Publication Data
US 2018/0208265 A1    Jul. 26, 2018

Related U.S. Application Data

(60) Provisional application No. 62/450,576, filed on Jan. 26, 2017.

(30) Foreign Application Priority Data

Nov. 22, 2017  (TW) .................................. 106140606

(51) Int. Cl.
*B62K 19/18* (2006.01)
*B32B 27/08* (2006.01)
(Continued)

(52) U.S. Cl.
CPC .............. *B62K 19/18* (2013.01); *B29C 70/08* (2013.01); *B29C 70/081* (2013.01);
(Continued)

(58) Field of Classification Search
CPC ........ B62K 19/16; B62K 19/18; B62K 19/28; B62K 19/32; B62K 19/34; B29C 70/08;
(Continued)

(56) References Cited

U.S. PATENT DOCUMENTS

| | | | |
|---|---|---|---|
| 4,339,490 A | * | 7/1982 | Yoshioka ................ B29C 70/00 428/213 |
| 4,856,800 A | | 8/1989 | Hashimoto et al. |

(Continued)

FOREIGN PATENT DOCUMENTS

| | | |
|---|---|---|
| CN | 1113471 A | 12/1995 |
| CN | 1666922 A | 9/2005 |

(Continued)

OTHER PUBLICATIONS

"Length", Merriam-Webster Online Dictionary, 2009, https://www.merriam-webster.com/dictionary/length (Year: 2009).*
TW201416287A English translation (Year: 2014).*

*Primary Examiner* — Jasper Saberi
(74) *Attorney, Agent, or Firm* — CKC & Partners Co., LLC

(57) ABSTRACT

A joint structure of a composite bicycle frame includes a base layer and at least one reinforcing layer. The base layer is made of a first polymeric matrix material doped with a plurality of first fibers. The first fibers have random fiber orientation, and the base layer has a first thickness. The reinforcing layer is adhesively connected to the base layer. The reinforcing layer is made of a second polymeric matrix material doped with a plurality of second fibers. The second fibers have a single fiber orientation. The reinforcing layer has a second thickness which is smaller than the first thickness of the base layer.

17 Claims, 12 Drawing Sheets

(51) Int. Cl.
  B32B 27/18    (2006.01)
  B29C 70/12    (2006.01)
  B62K 19/16    (2006.01)
  B29C 70/08    (2006.01)
  B29C 70/46    (2006.01)
  B32B 27/12    (2006.01)
  B32B 5/22     (2006.01)
  B32B 5/26     (2006.01)
  B62K 19/34    (2006.01)
  B29C 70/20    (2006.01)
  B32B 5/12     (2006.01)
  B62K 19/28    (2006.01)
  B62K 19/32    (2006.01)
  B29L 31/30    (2006.01)
  B29K 307/04   (2006.01)

(52) U.S. Cl.
  CPC .......... *B29C 70/083* (2013.01); *B29C 70/085* (2013.01); *B29C 70/12* (2013.01); *B29C 70/20* (2013.01); *B29C 70/462* (2013.01); *B32B 5/12* (2013.01); *B32B 5/22* (2013.01); *B32B 5/26* (2013.01); *B32B 27/08* (2013.01); *B32B 27/12* (2013.01); *B32B 27/18* (2013.01); *B62K 19/16* (2013.01); *B62K 19/28* (2013.01); *B62K 19/32* (2013.01); *B62K 19/34* (2013.01); *B29K 2307/04* (2013.01); *B29L 2031/3091* (2013.01); *B32B 2250/20* (2013.01); *B32B 2260/021* (2013.01); *B32B 2262/106* (2013.01); *B32B 2605/00* (2013.01)

(58) Field of Classification Search
  CPC ... B29C 70/081; B29C 70/083; B29C 70/085; B29C 70/20; B29C 70/12; B29C 70/462; B32B 27/08; B32B 27/12; B32B 5/12; B32B 5/22; B32B 5/26; B32B 2250/20; B32B 2260/021
  See application file for complete search history.

(56) References Cited

U.S. PATENT DOCUMENTS

| | | |
|---|---|---|
| 4,900,048 A | 2/1990 | Derujinsky |
| 5,624,519 A | 4/1997 | Nelson et al. |
| 2005/0012298 A1* | 1/2005 | Dal Pra .................. B29C 70/081 280/281.1 |
| 2008/0224440 A1* | 9/2008 | Masuda .................. B62K 19/16 280/259 |
| 2013/0309001 A1* | 11/2013 | Teshima ............ B29C 66/72141 403/270 |
| 2017/0021888 A1* | 1/2017 | Hastie ....................... B62K 3/06 |

FOREIGN PATENT DOCUMENTS

| | | |
|---|---|---|
| CN | 201367084 Y | 12/2009 |
| CN | 103786822 A | 5/2014 |
| CN | 104494172 A | 4/2015 |
| CN | 105083020 A | 11/2015 |
| CN | 105818914 A | 8/2016 |
| EP | 0587927 A1 | 3/1994 |
| TW | 201416287 A | 5/2014 |

* cited by examiner

JOINT STRUCTURE OF A COMPOSITE BICYCLE FRAME AND MANUFACTURING METHOD THEREOF

RELATED APPLICATIONS

This application claims priority to U.S. Provisional Application Ser. No. 62/450,576 filed Jan. 26, 2017, and Taiwan Application Serial Number 106140606, filed Nov. 22, 2017, the disclosures of which are incorporated herein by reference in their entireties.

BACKGROUND

Technical Field

The present disclosure relates to a joint structure of a composite bicycle frame and a manufacturing method thereof. More particularly, the present disclosure relates to a joint structure of a composite bicycle frame and a manufacturing method thereof which are capable of simplifying the process and saving the manufacturing time.

Description of Related Art

In general, carbon fibers have been used in bicycle frames. Conventional joint structures of carbon fiber bicycle frames generally have dominated strength and rigidity. However, the unidirectional carbon fiber composite material has anisotropic properties, so that implementation of the stacked layer structure has to pay great attention to the layup orientation optimization.

The directional properties of the carbon fiber composite material can be carried out by stacking a plurality of layers in different orientations. FIG. 1A shows a schematic view of a conventional joint structure 100 of a composite bicycle frame; and FIG. 1B shows an exploded view of the conventional joint structure 100 of the composite bicycle frame of FIG. 1A. The conventional joint structure 100 includes a plurality of base layers 110 having more than 10 layers stacked to each other. Each layer has a thickness of 0.1-0.2 mm. In the manufacturing process of the conventional joint structure of carbon fiber bicycle frames, the waste of manpower and time will be caused by stacking too much layers with tedious layup of unidirectional fiber prepreg so as to increase manufacturing cost, as shown in FIG. 1B.

In addition, another joint structure of a composite bicycle frame is manufactured based on an injection molding joint. Carbon fabric is used in one-piece injection molding process only for reinforcement in certain portions of the composite bicycle frame. However, the one-piece injection molding process requires a high cost mold, and the strength of the injection joint is still significantly lower than that of continuous-fiber composite materials.

Therefore, a joint structure of the composite bicycle frame and a manufacturing method thereof having the features of isotropy, low cost, simple process and short manufacturing time are commercially desirable.

SUMMARY

According to one aspect of the present disclosure, a joint structure of a composite bicycle frame includes a base layer and at least one reinforcing layer. The base layer is made of a first polymeric matrix material doped with a plurality of first fibers. The first fibers have random fiber orientation, and the base layer has a first thickness. The reinforcing layer is adhesively connected to the base layer. The reinforcing layer is made of a second polymeric matrix material doped with a plurality of second fibers. The second fibers have a single fiber orientation. The reinforcing layer has a second thickness which is smaller than the first thickness of the base layer.

According to another aspect of the present disclosure, a manufacturing method of a joint structure of a composite bicycle frame provides a base layer forming step, a reinforcing layer forming step and a joint structure forming step. The base layer forming step is for mixing a plurality of first fibers with a resin, and then the first fibers mixed with the resin are pre-pressed together to form a base layer. The first fibers have random fiber orientation. The reinforcing layer forming step is for forming a reinforcing layer by a second polymeric matrix material doped with a plurality of second fibers, and then adhesively connecting the reinforcing layer to the base layer to form a multilayer composite material. The second fibers have a single fiber orientation. The joint structure forming step is for disposing the multilayer composite material in a mold, and then hot pressing to form the joint structure of the composite bicycle frame.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
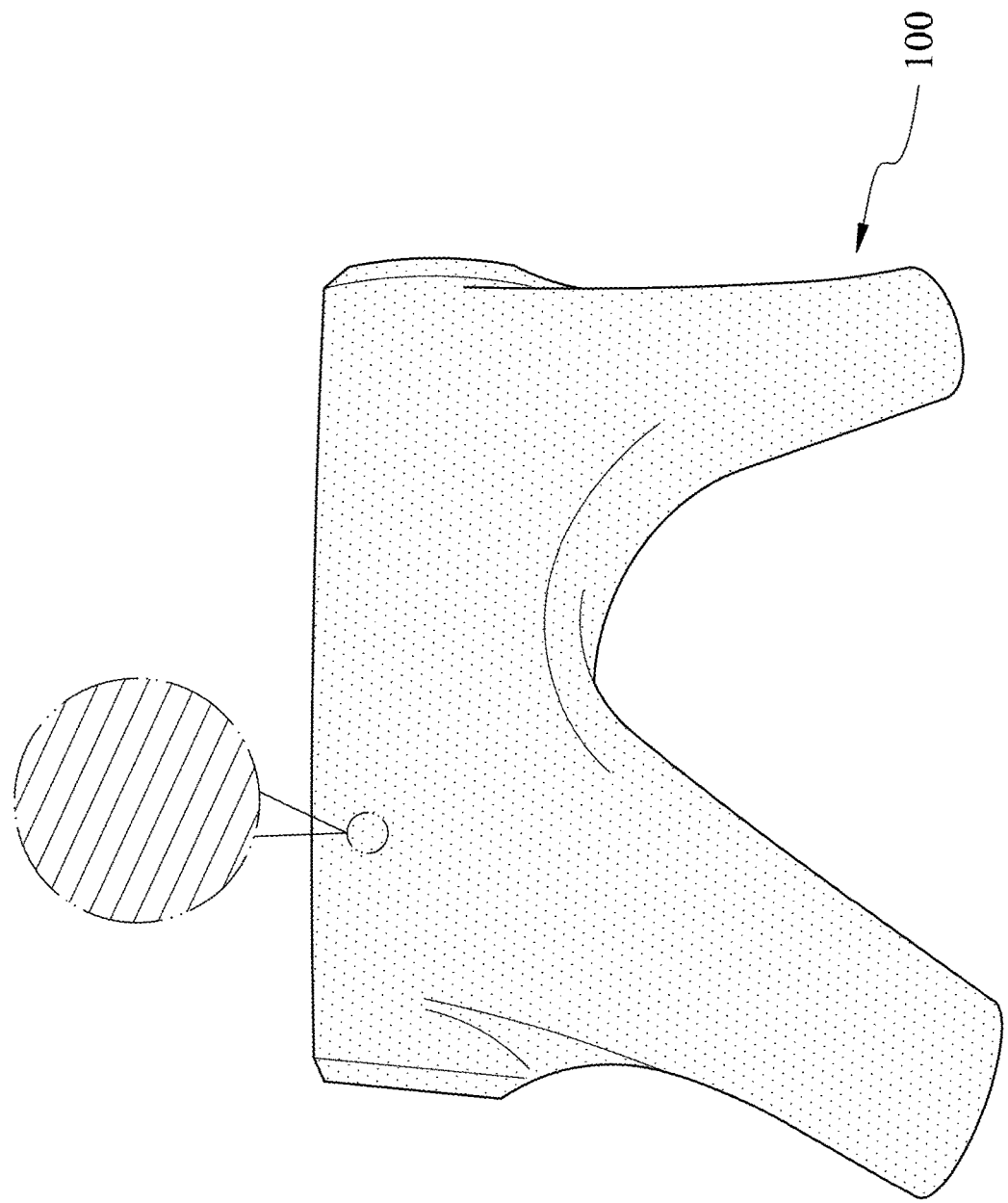
FIG. 1A shows a schematic view of a conventional joint structure of a composite bicycle frame.
Figure 1B:
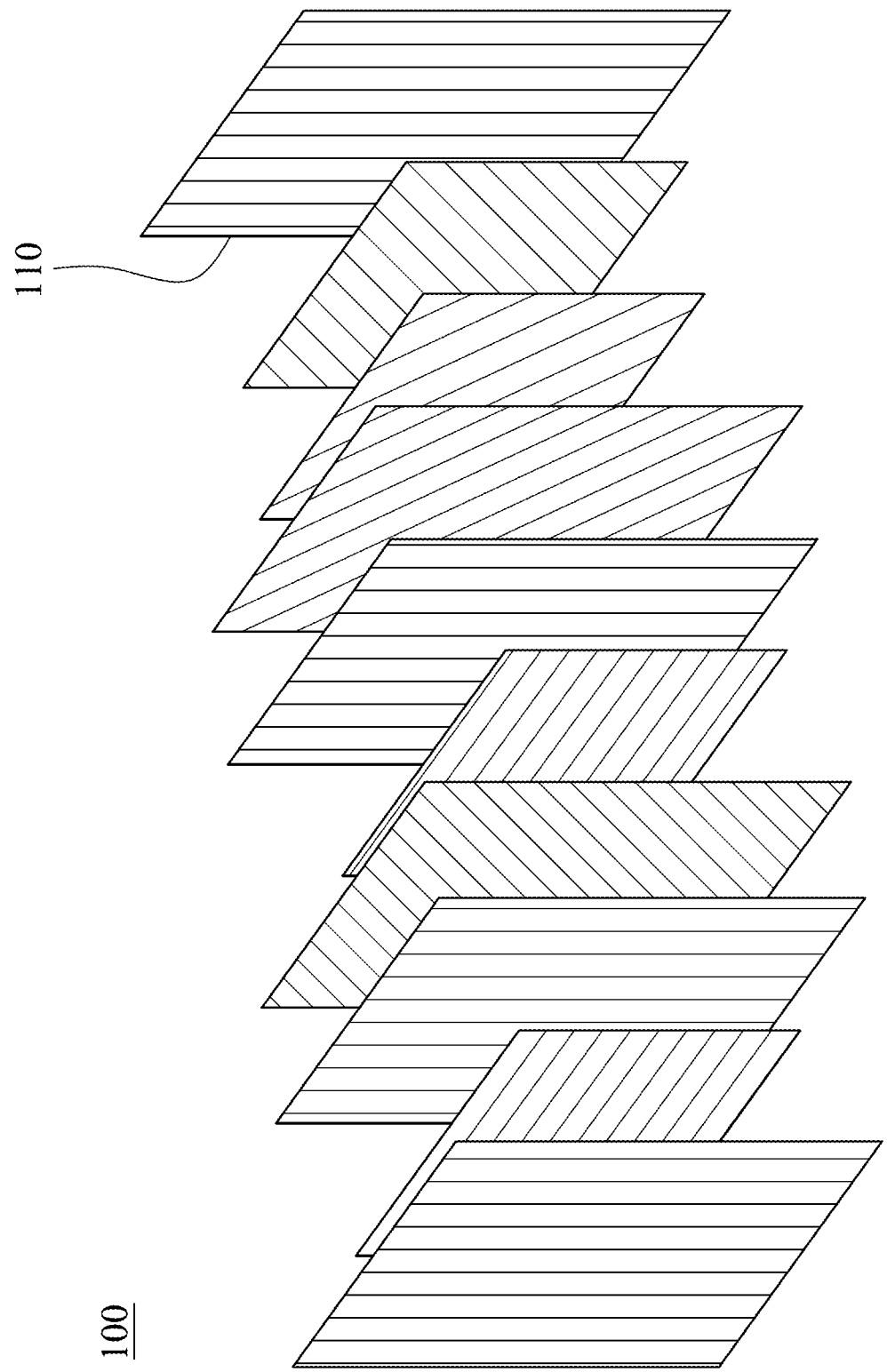
FIG. 1B shows an exploded view of the conventional joint structure of the composite bicycle frame of FIG. 1A.
Figure 2A:
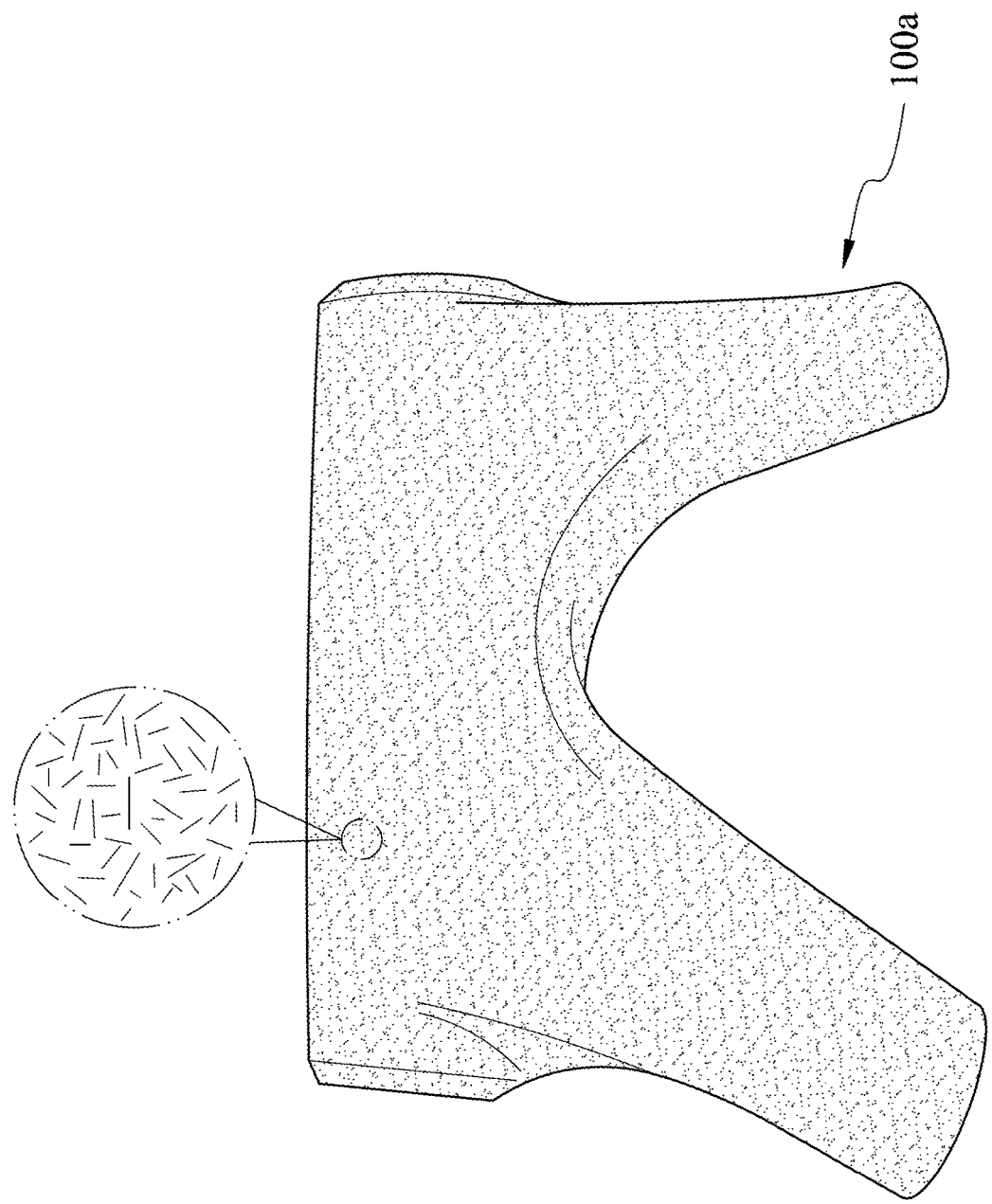
FIG. 2A shows a schematic view of a joint structure of a composite bicycle frame according to a first embodiment of the present disclosure.
Figure 2B:
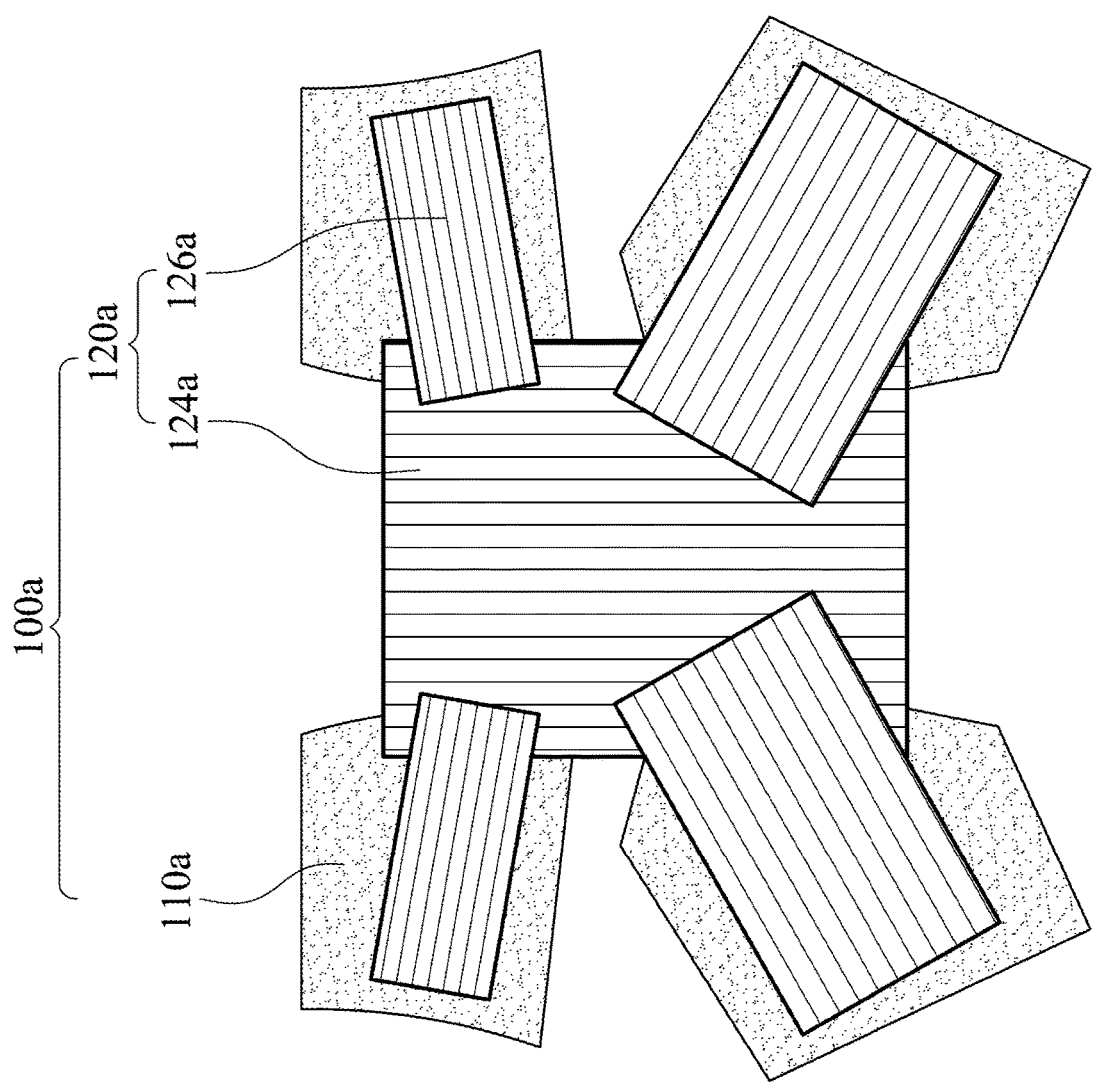
FIG. 2B shows an expanded schematic view of the joint structure of the composite bicycle frame of FIG. 2A.
Figure 2C:
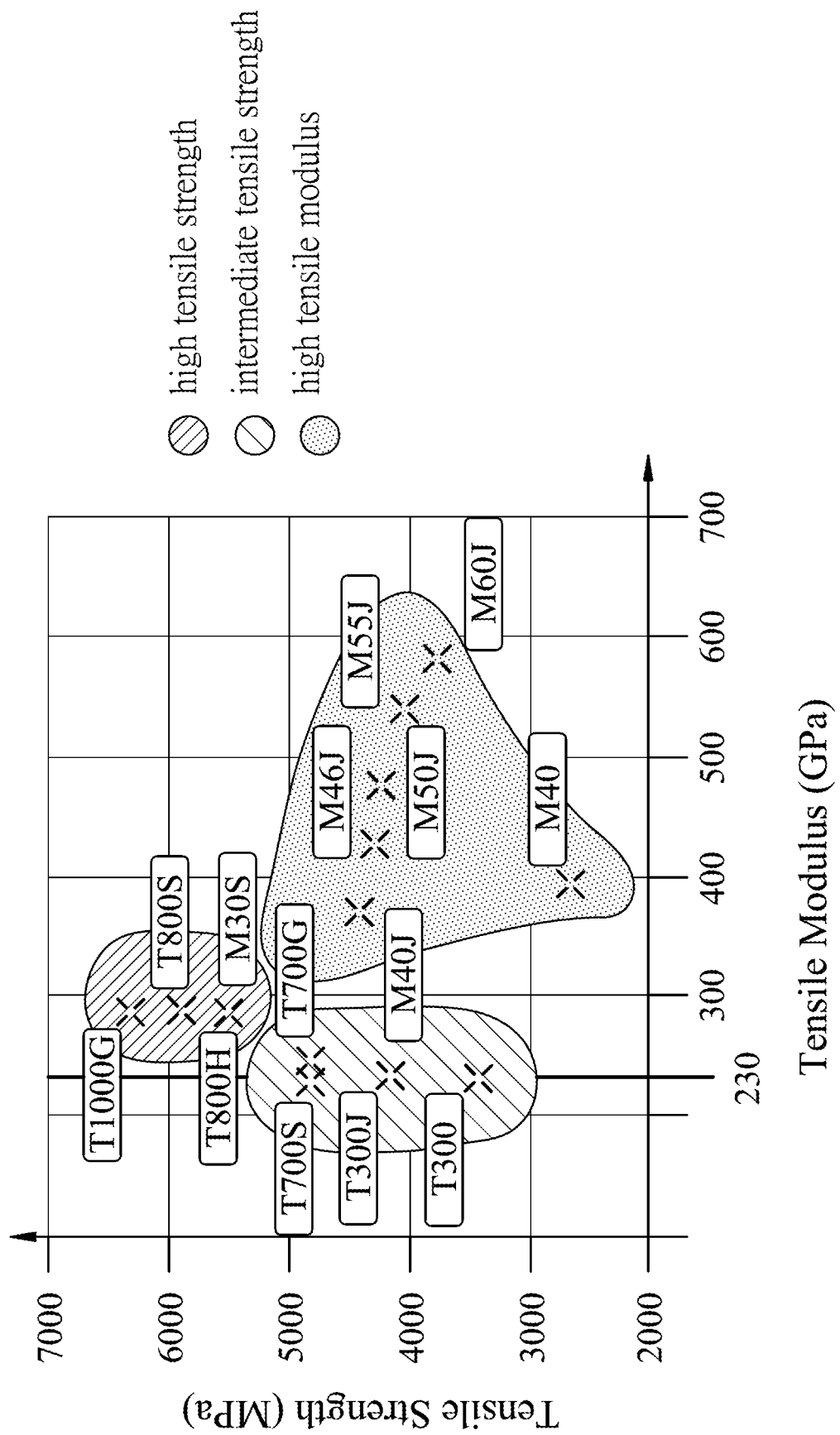
FIG. 2C shows a comparison of material properties of different carbon fibers.
Figure 3A:
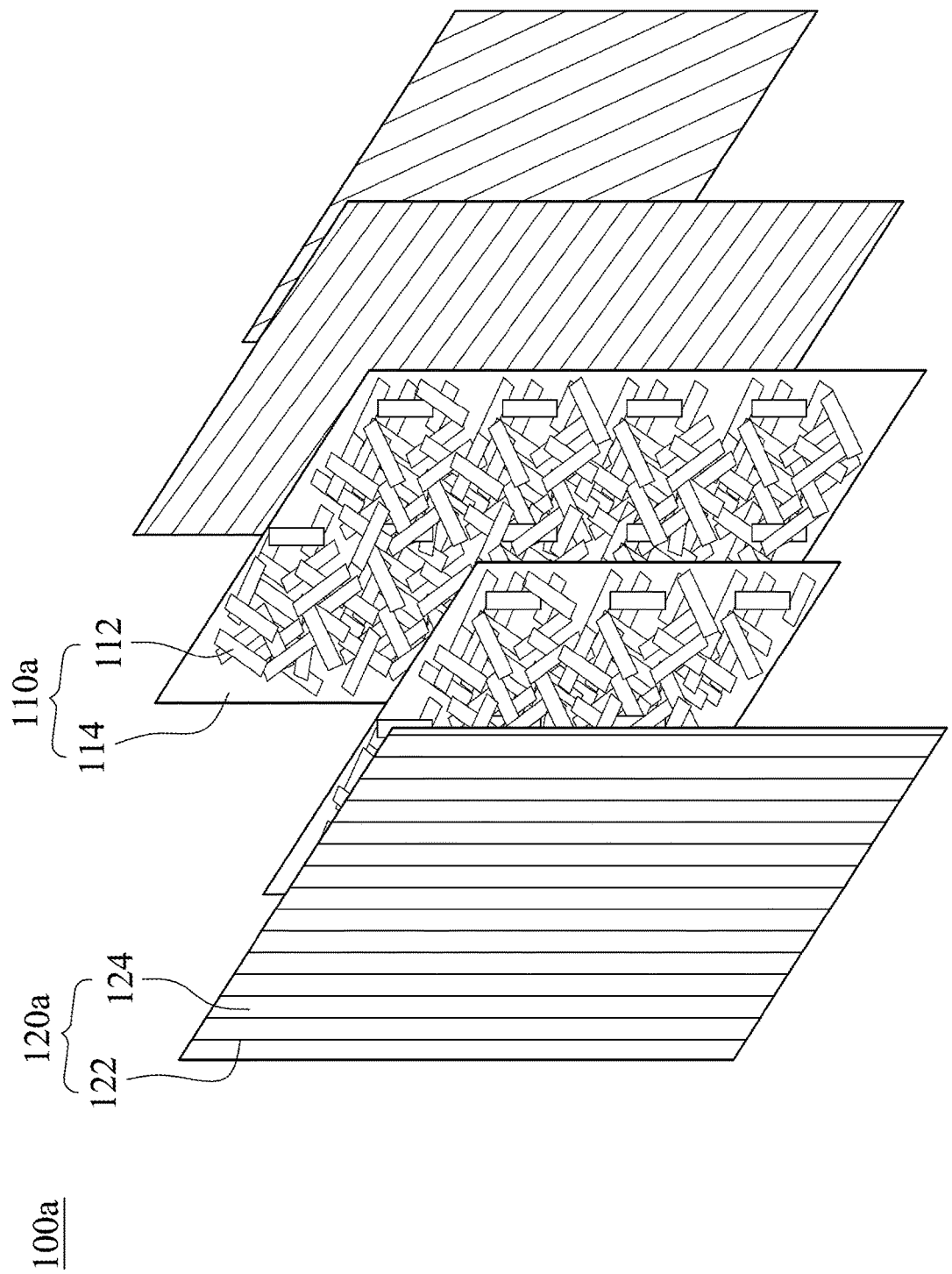
FIG. 3A shows an exploded view of the joint structure of the composite bicycle frame of FIG. 2A.
Figure 3B:
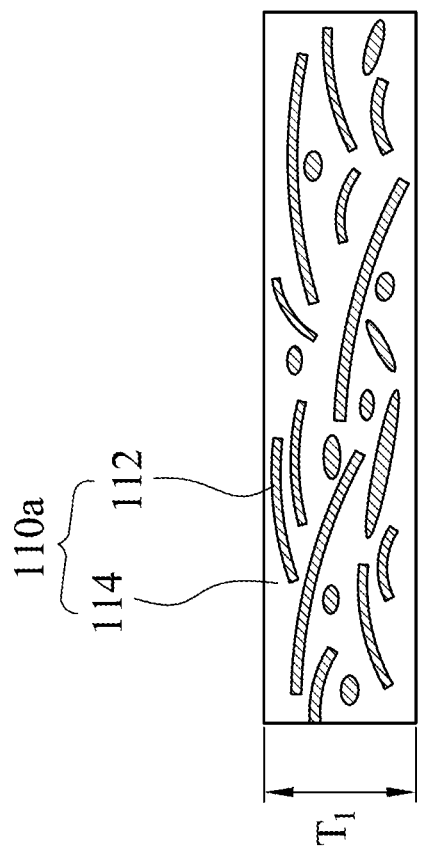
FIG. 3B shows a cross-sectional view of a base layer of the joint structure of the composite bicycle frame of FIG. 3A.
Figure 3C:
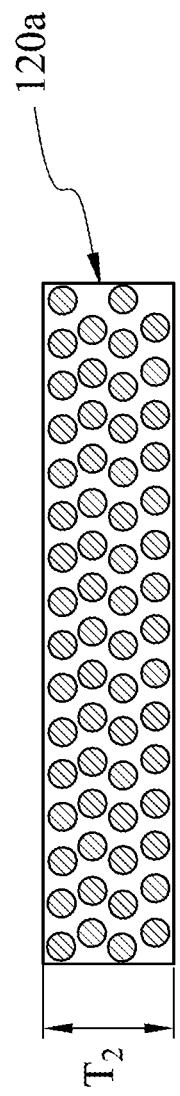
FIG. 3C shows a cross-sectional view of a reinforcing layer of the joint structure of the composite bicycle frame of FIG. 3A.

FIG. 2A shows a schematic view of a joint structure 100a of a composite bicycle frame according to a first embodiment of the present disclosure; FIG. 2B shows an expanded schematic view of the joint structure 100a of the composite bicycle frame of FIG. 2A; FIG. 2C shows a comparison of material properties of different carbon fibers; FIG. 3A shows an exploded view of the joint structure 100a of the composite bicycle frame of FIG. 2A; FIG. 3B shows a cross-sectional view of a base layer 110a of the joint structure 100a of the composite bicycle frame of FIG. 3A; and FIG. 3C shows a cross-sectional view of a reinforcing layer 120a of the joint structure 100a of the composite bicycle frame of FIG. 3A. In FIGS. 2A-3C, the joint structure 100a of the composite bicycle frame includes the base layer 110a and the reinforcing layer 120a.

The base layer 110a is made of a first polymeric matrix material doped with a plurality of first fibers 112. The first fibers 112 have random fiber orientation, and the base layer 110a has a first thickness T1. In detail, the first polymeric matrix material of the base layer 110a is made of the first fibers 112 and a resin 114 which are pre-pressed together. The first fibers 112 include carbon fibers, inorganic fibers (e.g., glass fibers), high-tenacity artificial fibers (e.g., Kevlar fibers), natural fibers (e.g., flax fibers) or a combination thereof. In one embodiment, each of the first fibers 112 of the present disclosure is chopped carbon fiber. Each of the first fibers 112 has a fiber length and a fiber width. The fiber length is greater than or equal to 3 mm and smaller than or equal to 100 mm, and the fiber length is greater than the fiber width, so that each of the first fibers 112 has a slender shape. In addition, the fiber length is preferably equal to 12.7 mm (0.5 inch), 25.4 mm (1 inch) or 50.8 mm (2 inch). The smaller the fiber length is, the more the isotropy is, and the lower the stiffness is. On the contrary, the greater the fiber length is, the larger the stiffness is, and the more the anisotropy is. In order to achieve balance between stiffness and isotropy, the fiber length of 25.4 mm (1 inch) is an appropriate choice.

Moreover, the first thickness T1 of the base layer 110a may be greater than or equal to 0.25 mm and smaller than or equal to 3.5 mm. The first thickness T1 of the base layer 110a may be greater than or equal to 0.5 mm and smaller than or equal to 3.0 mm. The first thickness T1 of the base layer 110a may be greater than or equal to 1.0 mm and smaller than or equal to 3.0 mm. The first thickness T1 of the base layer 110a may be greater than or equal to 2.0 mm and smaller than or equal to 3.0 mm. In one embodiment, the first thickness T1 is more preferably greater than or equal to 0.5 mm and smaller than or equal to 1.0 mm, and most preferably equal to 0.5 mm. In practice, a total thickness of the joint structure 100a of the composite bicycle frame is about 1.0 to 3.0 mm. The greater the first thickness T1 is, the simpler the process is. However, the greater the first thickness T1 is, the more the manufacturing difficulty of pre-pressing the first fibers 112 mixed with the resin 114 in the base layer 110a is. More air is easily entrapped in the base layer 110a to decrease the strength of the joint structure 100a. Therefore, the first thickness T1 should be greater than a predetermined lower limit value and smaller than a predetermined upper limit value so as to effectively simplify the pre-form process with reasonable manufacturing difficulty.

The reinforcing layer 120a is adhesively connected to the base layer 110a. The reinforcing layer 120a is made of a second polymeric matrix material doped with a plurality of second fibers 122. The second fibers 122 have a single fiber orientation. The reinforcing layer 120a has a second thickness T2 which is smaller than the first thickness T1 of the base layer 110a. In detail, the second polymeric matrix material of the reinforcing layer 120a is made of the second fibers 122 and a resin 124 which are pre-pressed together. The second fibers 122 include carbon fibers, inorganic fibers (e.g., glass fibers), high-tenacity artificial fibers (e.g., Kevlar fibers), natural fibers (e.g., flax fibers) or a combination thereof. In one embodiment, each of the second fibers 122 of the present disclosure is unidirectional carbon fiber. A grade of the second fibers 122 may be different from a grade of the first fibers 112. In general, the grade of carbon fiber is classified as a tensile modulus and a tensile strength, as shown in FIG. 2C. The lowest grade of the carbon fibers manufactured by Toray Company, Japan, is T300. In the field of the composite bicycle frame, the grade of the most commonly used carbon fiber is T700 or T800. In one embodiment of the present disclosure, the carbon fiber T300 or T700 is selected as the first fibers 112 of the base layer 110a. Furthermore, the reinforcing layer 120a is utilized to reinforce a local stiffness or strength of the joint structure 100, so that the carbon fiber having a high tensile modulus (e.g., M40) or a high tensile strength (e.g., T1000) can be selected as the second fibers 122 of the reinforcing layer 120a. In other words, the tensile modulus of each of the second fibers 122 may be greater than the tensile modulus of each of the first fibers 112. The tensile strength of each of the second fibers 122 may be greater than the tensile strength of each of the first fibers 112. Additionally, the reinforcing layer 120a includes a base region 124a and four branch regions 126a, as shown in FIG. 2B. The base region 124a and the four branch regions 126a are adhesively connected to the base layer 110a and may overlap each other so as to reinforce the stiffness and strength in a specific single orientation. An area of the base layer 110a is greater than an area of each of the four branch regions 126a.

In addition, the first thickness T1 of the base layer 110a is at least two times greater than the second thickness T2 of the reinforcing layer 120a. For example, if a total thickness of the joint structure is 3.0 mm, a thickness of a conventional unidirectional fiber prepreg (carbon fibers impregnated with resin) is about 0.1 mm, thereby requiring 30-layer conventional unidirectional fiber prepregs to form the joint structure. Due to anisotropic properties of the conventional unidirectional fiber prepregs, a conventional method utilizes plural unidirectional fiber prepregs in each of three orientations, i.e., 0 degrees, 45 degrees and 90 degrees, to form the joint structure. However, the joint structure 100a of the composite bicycle frame of the present disclosure utilizes the first thickness T1 of the base layer 110a being 0.5-3.0 mm and the second thickness T2 of the reinforcing layer 120a being 0.1-0.2 mm, so that the base layers 110a having 3-5 layers and few reinforcing layers 120a are used to accomplish the joint structure 100a of the composite bicycle frame. Certainly, the joint structure 100a may have only the base layers 110a without the reinforcing layer 120a, such as the base layers 110a having 6 layers, and each of the first thickness T1 of the base layers 110a is 0.5 mm. Moreover, when the first thickness T1 of the base layer 110a is smaller than two times of the second thickness T2 of the reinforcing layer 120a(e.g., the first thickness T1 is equal to 0.15 mm, and the second thickness T2 is equal to 0.1 mm, so that T1=0.15 mm<2×T2=0.2 mm), the joint structure 100a does not play a significant role in simplifying the process and enhancing isotropic properties. In other words, when the first thickness T1 of the base layer 110a is at least two times greater than the second thickness T2 of the reinforcing layer 120a, the effects of simplifying the process and enhancing isotropic properties may be more significant.

Therefore, the joint structure 100a of the composite bicycle frame of the present disclosure can provide much isotropic base and efficient reinforced structure with much less work. Instead of tedious layup of unidirectional fiber prepreg, the present disclosure can greatly save the manufacturing time and reduce manufacturing costs. In addition, the manufacturing method of the present disclosure can keep the strength and stiffness requirements, simplify the pre-form process, more possible for automation and thus reduce cost significantly. In other words, the present disclosure utilizes thick and isotropic materials to allow the joint structure 100a to have isotropic properties and keep the strength and stiffness requirements. The joint structure 100a may be located on a head lug portion, a seat lug portion or a bottom bracket portion. In addition, the carbon fiber material of the joint structure 100a is thick, thereby simplifying the pre-form process and saving the manufacturing time.

Figure 4:
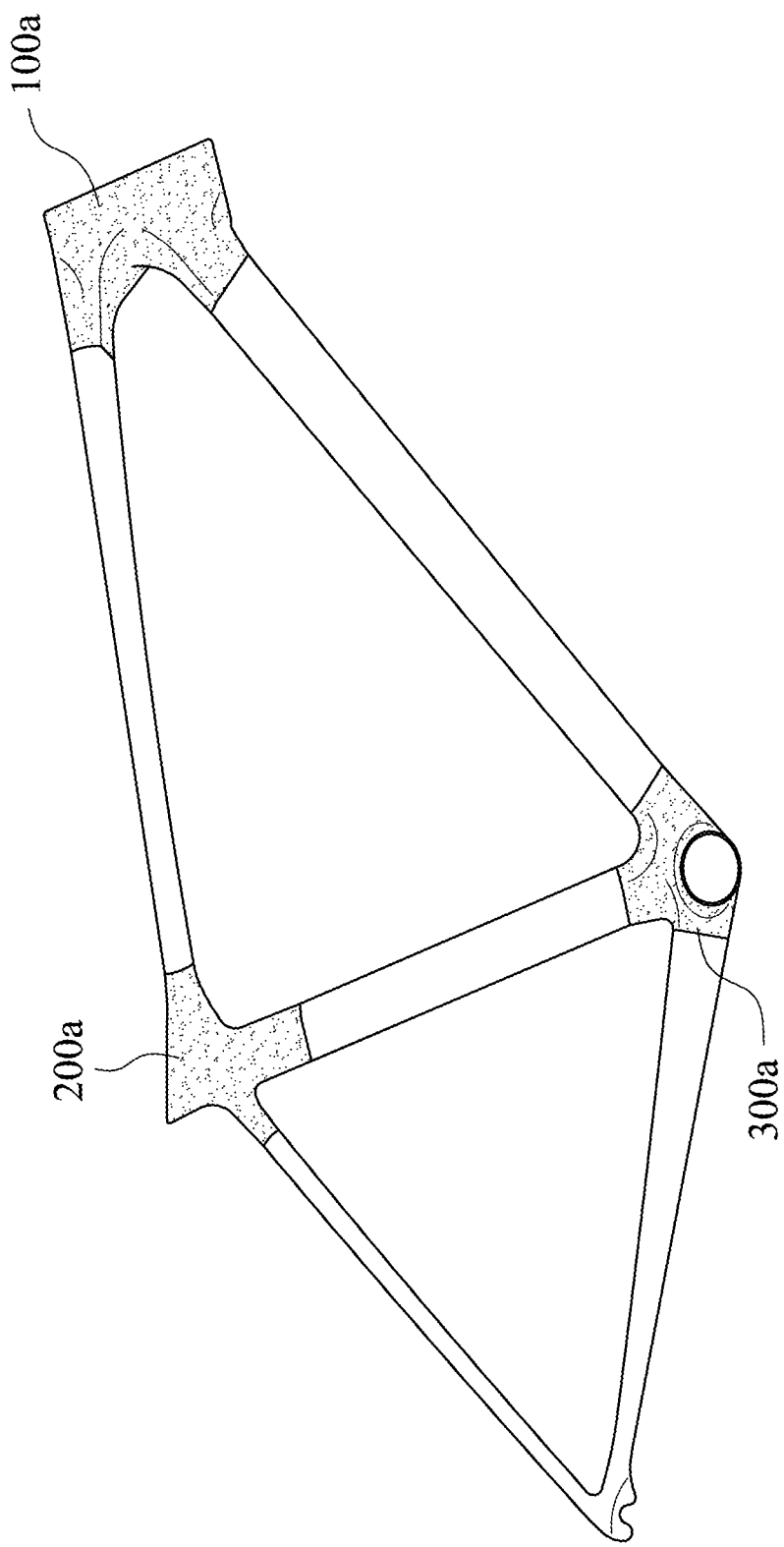
FIG. 4 shows a schematic view of the joint structure of FIG. 3A, applied to various portions of the composite bicycle frame.
Figure 5:
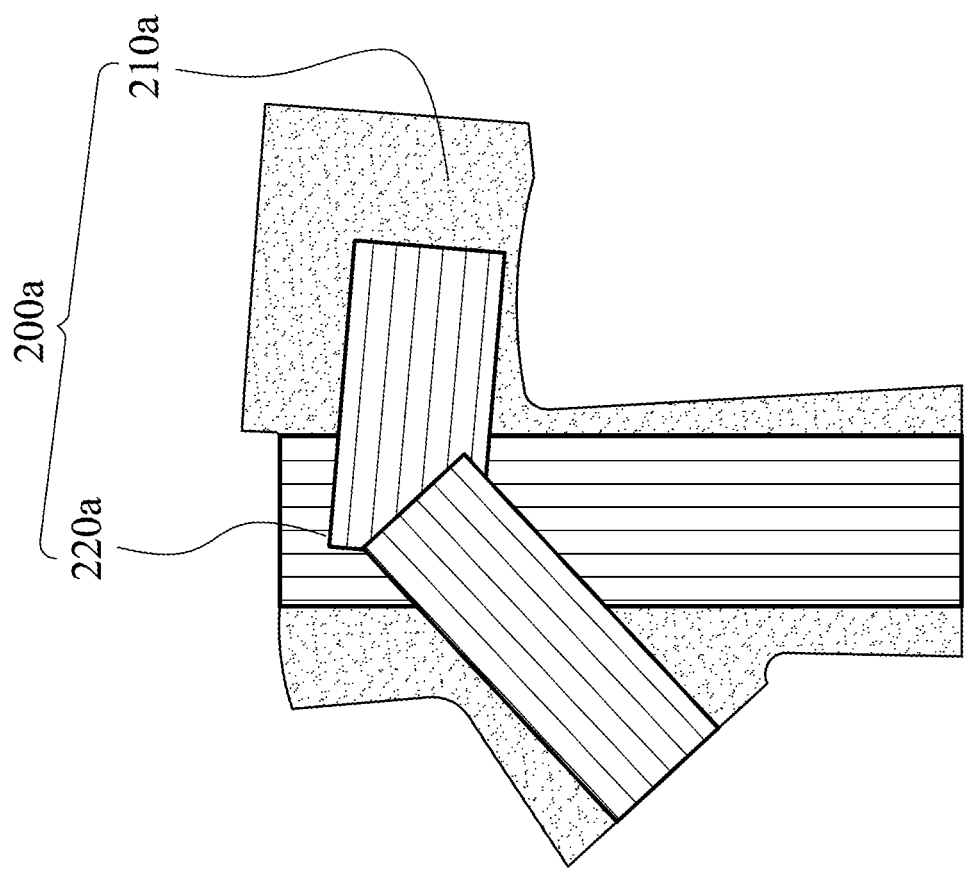
FIG. 5 shows an expanded schematic view of a joint structure of a composite bicycle frame according to a second embodiment of the present disclosure.
Figure 6:
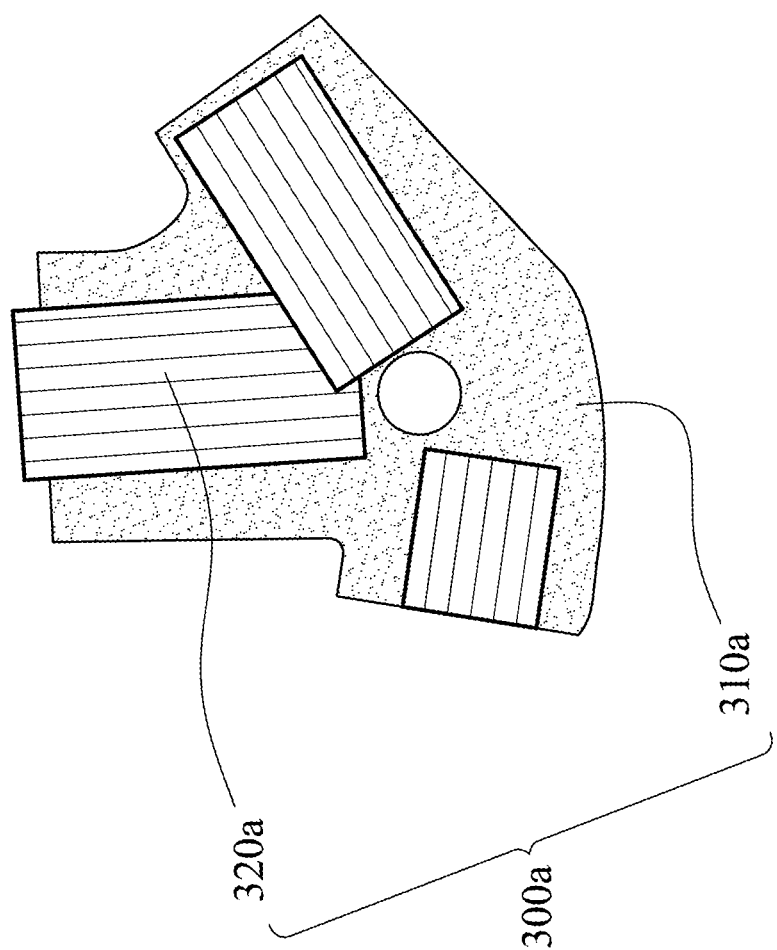
FIG. 6 shows an expanded schematic view of a joint structure of a composite bicycle frame according to a third embodiment of the present disclosure.

FIG. 4 shows a schematic view of the joint structure 100a of FIG. 3A, applied to various portions of the composite bicycle frame; FIG. 5 shows an expanded schematic view of a joint structure 200a of a composite bicycle frame according to a second embodiment of the present disclosure; and FIG. 6 shows an expanded schematic view of a joint structure 300a of a composite bicycle frame according to a third embodiment of the present disclosure. In FIGS. 3A, 4, 5 and 6, the composite bicycle frame includes three joint structures 100a, 200a, 300a. The joint structure 100a is disposed on the head lug portion, as shown in FIG. 2B. The joint structure 200a is disposed on the seat lug portion, as shown in FIG. 5. The joint structure 300a is disposed on the bottom bracket portion, as shown in FIG. 6. Hence, the joint structures 100a, 200a, 300a can be applied to various portions of the composite bicycle frame. The joint structure 200a of the composite bicycle frame includes a base layer 210a and a reinforcing layer 220a. The reinforcing layer 220a is adhesively connected to the base layer 210a. The joint structure 300a of the composite bicycle frame includes a base layer 310a and a reinforcing layer 320a. The reinforcing layer 320a is adhesively connected to the base layer 310a. The detail of the base layers 210a, 310a is the same as the base layer 110a of FIG. 3A. The detail of the reinforcing layers 220a, 320a is the same as the reinforcing layer 120a of FIG. 3A. Because the joint structures 100a, 200a, 300a are located at different positions and have different types of connections, there are differences between the joint structures 100a, 200a, 300a. Accordingly, the joint structures 100a, 200a, 300a of the present disclosure can be applied to various portions of the composite bicycle frame. In addition, the present disclosure is suitable for mass production, keeps the strength and stiffness requirements, greatly saves the manufacturing time and reduces manufacturing costs.

Figure 7:
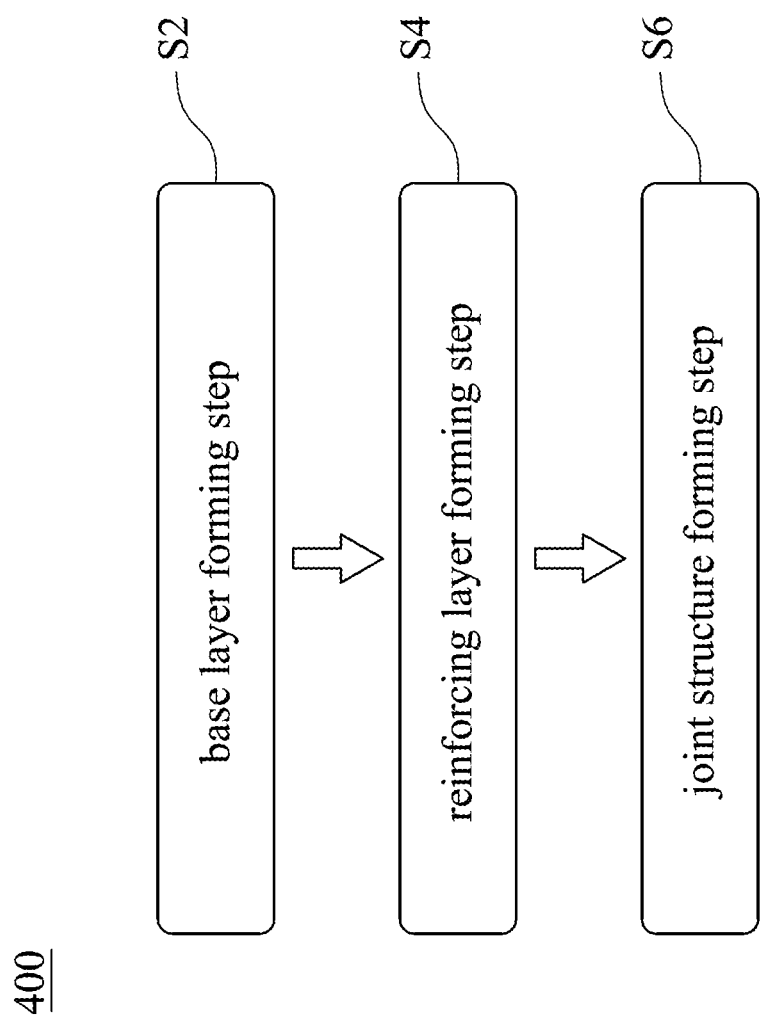
FIG. 7 shows a flow chart of a manufacturing method of a joint structure of a composite bicycle frame according to one embodiment of the present disclosure.

FIG. 7 shows a flow chart of a manufacturing method 400 of a joint structure 100a, 200a, 300a of a composite bicycle frame according to one embodiment of the present disclosure. The manufacturing method 400 provides a base layer forming step S2, a reinforcing layer forming step S4 and a joint structure forming step S6. The base layer forming step is for cutting a plurality of original fibers to form the first fibers 112. Each of the original fibers has an original length which is greater than 100 mm and smaller than 5000 m. Each of the first fibers 112 has a fiber length and a fiber width. The fiber length is greater than or equal to 3 mm and smaller than or equal to 100 mm, and the fiber length is greater than the fiber width. Then, the base layer forming step S2 is for mixing a plurality of first fibers 112 with a resin 114, and then the first fibers 112 mixed with the resin 114 are pre-pressed together to form a plurality of base layers 110a, 210a, 310a. The first fibers 112 have random fiber orientation. In addition, the reinforcing layer forming step S4 is for forming a plurality of reinforcing layers 120a, 220a, 320a by a second polymeric matrix material doped with a plurality of second fibers 122, and then respectively connecting the reinforcing layers 120a, 220a, 320a to the base layer 110a, 210a, 310a to form a plurality of multilayer composite materials. The second fibers 122 have a single fiber orientation. In the reinforcing layer forming step S4, the multilayer composite materials (i.e., carbon fiber prepreg layup) required for the joint structure are temporarily pre-molded by a plurality of temporary molds, and the reinforcing layers 120a, 220a, 320a are still soft and can be configured to adhere to the base layers 110a, 210a, 310a. The temporary molds are respectively corresponding to the joint structures 100a, 200a, 300a of the composite bicycle frame. After performing the base layer forming step S2 and the reinforcing layer forming step S4, each of the base layers 110a, 210a, 310a has a first thickness, and each of the reinforcing layers 120a, 220a, 320a has a second thickness which is smaller than the first thickness. Furthermore, the joint structure forming step S6 is for disposing the multilayer composite materials in a plurality of molds, and then hot pressing to form the joint structures 100a, 200a, 300a of the composite bicycle frame. Each of the molds is made of metal. After hot pressing, the multilayer composite materials are hardened to form a bicycle frame structure.

Therefore, the manufacturing method 400 of the present disclosure can utilize few stacked layers to accomplish the joint structures 100a, 200a, 300a with the multilayer composite materials. Instead of binding properties of the conventional unidirectional fiber, the base layers 110a, 210a, 310a with isotropic short fibers have good fluidity to reduce inter-layer void and allow the thickness of the joint structures 100a, 200a, 300a to be smoothly varied to enhance overall strength.

Figure 8:
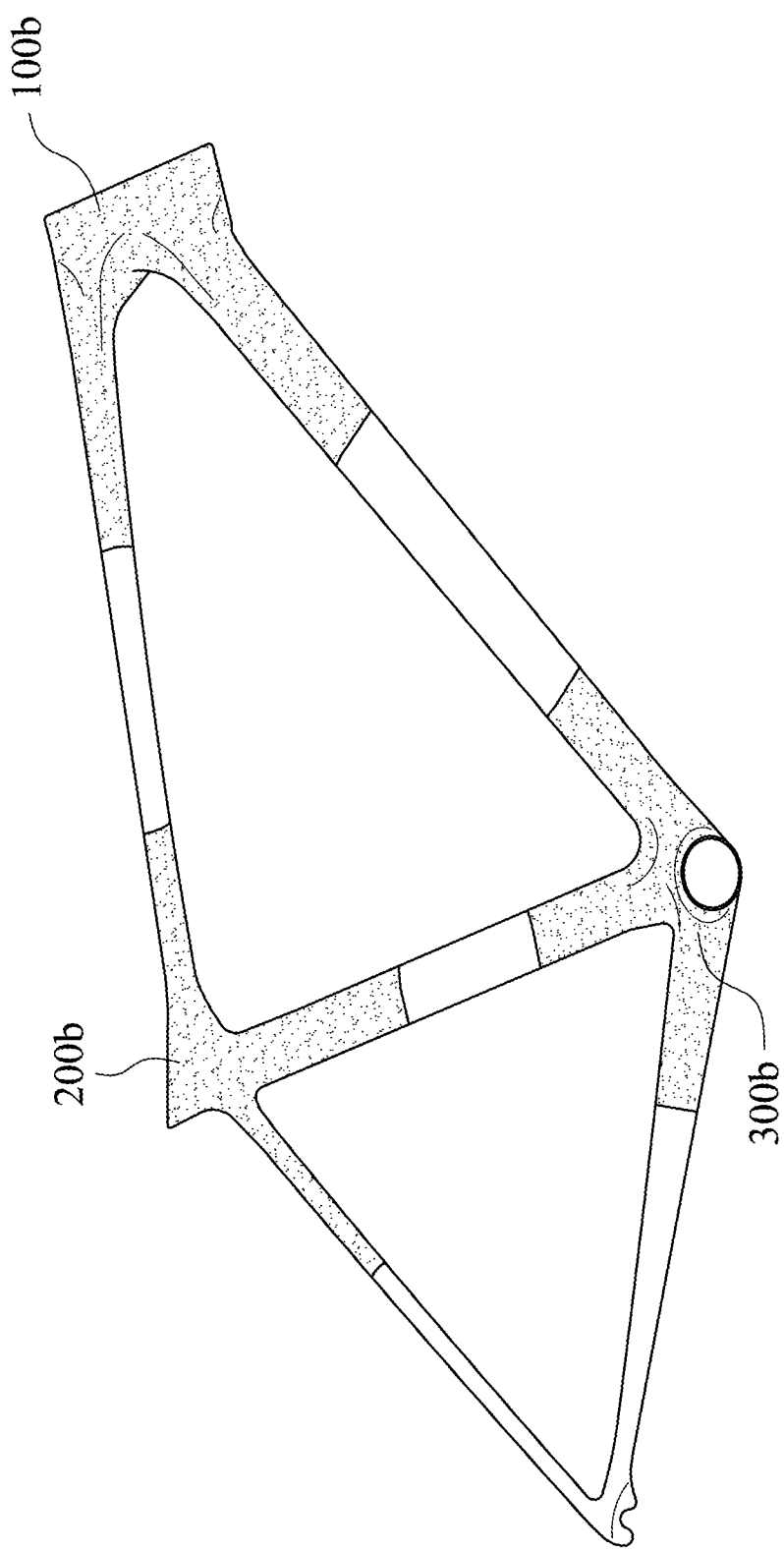
FIG. 8 shows a schematic view of the joint structure of FIG. 3A, applied to joint portions and pipe portions of the composite bicycle frame.

FIG. 8 shows a schematic view of the joint structure 100a of FIG. 3A, applied to joint portions and pipe portions of the composite bicycle frame. In FIGS. 3A, 4 and 8, the structures of the joint structures 100a, 200a, 300a are the same as the structures of the joint structures 100b, 200b, 300b, respectively. The composite bicycle frame includes a plurality of joint portions and a plurality of pipe portions. The joint portions are connected to the pipe portions, respectively. The base layer 110a and the reinforcing layer 120a are disposed on the joint portions and the pipe portions. The pipe portion is a part or a pipe extending outwardly from a branch of the joint portion. The structure of each of the pipe portions is the same as the joint structure 100a of FIG. 3A. In other words, the joint structures 100a, 200a, 300a are combined with pipes extending outwardly from branches of the joint structures 100a, 200a, 300a so as to form the joint structures 100b, 200b, 300b, respectively. Accordingly, no matter what the joint portion or the pipe portion is, the joint structure 100a of FIG. 3A can be used to accomplish the composite bicycle frame, thereby simplifying the process, saving the manufacturing time and enhancing overall strength.

According to the aforementioned embodiments and examples, the advantages of the present disclosure are described as follows.

1. The joint structure of the composite bicycle frame of the present disclosure can provide the much isotropic base and efficient reinforced structure with much less work. Instead of tedious layup of unidirectional fiber prepreg, the present disclosure can greatly save the manufacturing time and reduce manufacturing costs. In addition, the manufacturing method of the present disclosure can keep the strength and stiffness requirements, simplify the pre-form process, more possible for automation and thus reduce cost significantly.

2. The manufacturing method of the present disclosure can utilize few stacked layers to accomplish the joint structures with the multilayer composite materials. Instead of binding properties of the conventional unidirectional fiber, the base layers 110a, 210a, 310a with isotropic short fibers have good fluidity to reduce inter-layer void and allow the thickness of the joint structures 100a, 200a, 300a to be smoothly varied to enhance overall strength.

3. The joint structures of the present disclosure can be applied to various portions of the composite bicycle frame. In addition, the present disclosure is suitable for mass production, keeps the strength and stiffness requirements, greatly saves the manufacturing time and reduces manufacturing costs.

4. The joint structures of the present disclosure can be applied to the joint portion and the pipe portion of the composite bicycle frame, thereby simplifying the process, saving the manufacturing time and enhancing overall strength.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A joint structure of a composite bicycle frame, comprising:
   a base layer made of a first polymeric matrix material doped with a plurality of first fibers, wherein the first fibers have random fiber orientation, and the base layer has a first thickness, each of the first fibers has a fiber length, and the fiber length is greater than or equal to 12.7 mm and smaller than or equal to 25.4 mm; and
   at least one reinforcing layer adhesively connected to the base layer, wherein the reinforcing layer is made of a second polymeric matrix material doped with a plurality of second fibers, the second fibers have a single fiber orientation, and the reinforcing layer has a second thickness, and the first thickness of the base layer is at least two times greater than the second thickness of the reinforcing layer;
   wherein the joint structure is laid-up by stacking the base layer and the at least one reinforcing layer to form a head lug portion, a seat lug portion or a bottom bracket portion of the composite bicycle frame, and the base layer and the at least one reinforcing layer are formed by the first fibers and the second fibers respectively;
   wherein the first thickness is 0.25-3.5 mm, and the second thickness is 0.1-0.2 mm;
   wherein the first fibers and the second fibers comprise carbon fibers.

2. The joint structure of the composite bicycle frame of claim 1, wherein the reinforcing layer comprises:
   at least two branch regions adhesively connected to the base layer, wherein an area of the base layer is greater than an area of each of the two branch regions.

3. The joint structure of the composite bicycle frame of claim 2, wherein the reinforcing layer further comprises:
   a base region adhesively connected to the base layer.

4. The joint structure of the composite bicycle frame of claim 1, wherein the first thickness of the base layer is greater than or equal to 0.5 mm and smaller than or equal to 3.0 mm.

5. The joint structure of the composite bicycle frame of claim 1, wherein the first thickness of the base layer is greater than or equal to 1.0 mm and smaller than or equal to 3.0 mm.

6. The joint structure of the composite bicycle frame of claim 1, wherein the first thickness of the base layer is greater than or equal to 2.0 mm and smaller than or equal to 3.0 mm.

7. The joint structure of the composite bicycle frame of claim 1, wherein each of the first fibers has a fiber width, and the fiber length is greater than the fiber width.

8. The joint structure of the composite bicycle frame of claim 7, wherein the fiber length is equal to 25.4 mm.

9. The joint structure of the composite bicycle frame of claim 1, wherein the first polymeric matrix material is made of the first fibers and a resin which are pre-pressed together.

10. The joint structure of the composite bicycle frame of claim 1, wherein a tensile modulus of each of the second fibers is greater than a tensile modulus of each of the first fibers.

11. The joint structure of the composite bicycle frame of claim 10, wherein a tensile strength of each of the second fibers is greater than a tensile strength of each of the first fibers.

12. The joint structure of the composite bicycle frame of claim 1, wherein when the joint structure is applied to a head lug portion of the composite bicycle frame:
   the reinforcing layer comprises a base region, and four branch regions;
   the four branch regions are spatially separated from each other, the four branch regions and the base region overlap each other, and each of the four branch regions has a first portion vertically stacked on the base region and a second portion extending away from the base region;
   the base layer comprises four base layer sections which are spatially separated from each other, and the second portion of each of the four branch regions of the reinforcing layer is vertically stacked on a corresponding one of the base layer sections; and
   the base region of the reinforcing layer is adhesively connected to the base layer sections, and the second portion of each of the four branch regions of the reinforcing layer is adhesively connected respectively to the base layer sections whereat the second portion of each of the four branch regions is vertically stacked on the corresponding one of the base layer sections.

13. The joint structure of the composite bicycle frame of claim 12, wherein the base region of the reinforcing layer is substantially rectangular and has four corner sections, and the four corner sections are adhesively connected respectively to the four base layer sections of the base layer.

14. A manufacturing method of the joint structure of the composite bicycle frame of claim 1, comprising:
   providing a base layer forming step, wherein the base layer forming step is for mixing the first fibers with a resin, and then the first fibers mixed with the resin are pre-pressed together to form the base layer, and the first fibers have random fiber orientation;

providing a reinforcing layer forming step, wherein the reinforcing layer forming step is for forming the reinforcing layer by the second polymeric matrix material doped with the second fibers, and then adhesively connecting the reinforcing layer to the base layer to form a multilayer composite material, and the second fibers have the single fiber orientation; and providing a joint structure forming step, wherein the joint structure forming step is for disposing the multilayer composite material in a mold, and then hot pressing to form the joint structure of the composite bicycle frame.

15. The manufacturing method of the joint structure of the composite bicycle frame of claim 14, wherein the base layer forming step is for cutting a plurality of original fibers to form the first fibers, each of the original fibers has an original length which is greater than 100 mm and smaller than 5000 m, each of the first fibers has the fiber length and a fiber width, the fiber length is greater than or equal to 3 mm and smaller than or equal to 100 mm, and the fiber length is greater than the fiber width.

16. The manufacturing method of the joint structure of the composite bicycle frame of claim 14, wherein, after performing the base layer forming step and the reinforcing layer forming step, the base layer has the first thickness, and the reinforcing layer has the second thickness which is smaller than the first thickness.

17. The manufacturing method of the joint structure of the composite bicycle frame of claim 16, wherein the first thickness of the base layer is at least two times greater than the second thickness of the reinforcing layer.

\* \* \* \* \*